United States Patent
Kinsey

(10) Patent No.: US 11,948,174 B2
(45) Date of Patent: Apr. 2, 2024

(54) SYSTEMS AND METHODS FOR PHYSICAL-TO-DIGITAL REMARKETING USING BEACONS

(71) Applicant: Volta Charging, LLC, San Francisco, CA (US)

(72) Inventor: Jeffrey Kinsey, San Francisco, CA (US)

(73) Assignee: Volta Charging LLC, San Francisco, CA (US)

( * ) Notice: Subject to any disclaimer, the term of this patent is extended or adjusted under 35 U.S.C. 154(b) by 205 days.

(21) Appl. No.: 17/521,698

(22) Filed: Nov. 8, 2021

(65) Prior Publication Data
US 2022/0148042 A1    May 12, 2022

Related U.S. Application Data

(60) Provisional application No. 63/111,453, filed on Nov. 9, 2020.

(51) Int. Cl.
*G06Q 30/0241* (2023.01)
*H04W 4/80* (2018.01)

(52) U.S. Cl.
CPC .......... *G06Q 30/0277* (2013.01); *H04W 4/80* (2018.02)

(58) Field of Classification Search
CPC ............................ G06Q 30/0277; H04W 4/80
See application file for complete search history.

(56) References Cited

U.S. PATENT DOCUMENTS

| | | | | |
|---|---|---|---|---|
| 11,622,257 B1* | 4/2023 | Mars | ..................... | H04W 12/61 455/41.2 |
| 2002/0132614 A1* | 9/2002 | Vanluijt | ................ | G06Q 20/382 455/414.1 |
| 2011/0258049 A1* | 10/2011 | Ramer | ............... | G06Q 30/0273 705/14.69 |
| 2012/0252418 A1* | 10/2012 | Kandekar | ............. | H04W 4/021 455/414.1 |
| 2015/0248702 A1 | 9/2015 | Chatterton | | |
| 2018/0160282 A1* | 6/2018 | van de Poll | .......... | H04W 4/029 |
| 2018/0295476 A1* | 10/2018 | Stewart | ................... | H04W 4/02 |
| 2019/0322188 A1* | 10/2019 | Schrader | ............... | B60L 53/665 |
| 2020/0402099 A1* | 12/2020 | Pittman | .............. | G06Q 30/0244 |

FOREIGN PATENT DOCUMENTS

WO    WO 2016/170316 A2    10/2016

OTHER PUBLICATIONS

Volta Charging, LLC, International Search Report and Written Opinion, PCT/US2021/058449, dated Feb. 28, 2022, 9 pgs.

* cited by examiner

*Primary Examiner* — David Bilodeau
(74) *Attorney, Agent, or Firm* — Morgan, Lewis & Bockius LLP

(57) ABSTRACT

The disclosed embodiments provide systems and methods for transmitting beacon signals that are associated with media content. A kiosk displays first media content on the electronic display. The kiosk transmits, at a radio frequency using a wireless transmitter of the kiosk, a first beacon signal that includes an identifier of the first media content. The kiosk replaces display of the first media content with display of second media content on the display. Upon replacing display of the first media content with the second media content, the kiosk transmits, at the radio frequency using the wireless transmitter, a second beacon signal that includes an identifier of the second media content, distinct from the identifier of the first media content.

16 Claims, 9 Drawing Sheets

700
(Cont.)

(A)

724 Replace display of the first media content with display of second media content on the display.

> 726 The first media content is associated with a first party and the second media content is associated with a second party.

728 Upon replacing display of the first media content with the second media content, transmit, at the radio frequency using the wireless transmitter, a second beacon signal that includes an identifier of the second media content, distinct from the identifier of the first media content.

> 730 Each respective beacon signal comprises a predefined number of bits that encodes the respective identifier of respective media content.

> 732 The first beacon signal and the second beacon signal include an identifier of the kiosk.

734 Replace display of the second media content with display of third media content, wherein the third media content is distinct from the first media content and from the second media content. Upon replacing display of the second media content with the third media content, transmit, at the radio frequency using the wireless transmitter, a third beacon signal that includes an identifier of the third media content.

> 736 Replace display of the third media content with display of first media content. Upon replacing display of the third media content with the first media content, transmit, at the radio frequency using the wireless transmitter, the first beacon signal that includes the identifier of the first media content.

SYSTEMS AND METHODS FOR PHYSICAL-TO-DIGITAL REMARKETING USING BEACONS

PRIORITY APPLICATION

This application claims priority to U.S. Prov. App. No. 63/111,453, filed Nov. 9, 2020, which is hereby incorporated by reference in its entirety.

TECHNICAL FIELD

This application relates generally to beacon signals, and more particularly, to transmitting beacon signals from a kiosk (e.g., an outdoor kiosk, an electric vehicle charging station) based on media content that is dynamically displayed on a display of the kiosk.

BACKGROUND

Electric vehicle charging stations (EVCSs) typically use charging cables to provide an electrical current and charge a battery of an electric vehicle. The cables and control systems of the EVCSs are housed in kiosks in locations to allow a driver of an electric vehicle to pull the vehicle close to the EVCS and begin the charging process. These kiosks may be placed in areas of convenience, such as in parking lots at shopping centers, in front of commercial buildings, or in other public places. Consequently, passers-by, in addition to users of the EVCS, may notice media content displayed by the EVCS.

SUMMARY

Behavioral retargeting (also known as behavioral remarketing, or simply, retargeting or remarking) is a form of online targeted advertising by which online advertising is targeted to consumers based on their previous actions. In many circumstances, online advertisements are remarketed based on the consumer's previous Internet actions. For example, a consumer who looks at products on a website may be targeted with advertisements for those products, or related products, in the future. Often, a consumer will need to be exposed to the product multiple times before deciding to purchase the product.

While various methods exist for remarketing products or services to users based on their online behavior, it is much more difficult to remarket products based on their physical behaviors. For example, it is difficult to remarket a product advertised by a billboard, because it is difficult to know which consumers have viewed the billboard. To solve this problem, the disclosed embodiments provide a kiosk with a display, in which the kiosk emits a beacon signal that can be received by mobile devices of nearby users. The beacon signal identifies media content displayed on the display of the kiosk. Information from the beacon signal, and optionally the consumer, is transmitted from the mobile device to a server system, which can use the information to remarket, to the consumer, products or services related to those that were advertised on the kiosk. In some embodiments, the display of the kiosk displays different media content items (e.g., advertisements) at the different times, and the beacon signal identifies the media content item that is displayed at the time the beacon signal is transmitted. In this manner, the disclosed embodiments provide systems and methods for physical-to-digital remarketing.

To that end, in accordance with some embodiments, a method is performed at a kiosk that includes an electronic display and a wireless transmitter distinct from the display. The method includes, at the kiosk, displaying first media content on the electronic display. The method further includes transmitting, at a radio frequency using the wireless transmitter, a first beacon signal that includes an identifier of the first media content. The method includes replacing display of the first media content with display of second media content on the electronic display. The method further includes, upon replacing display of the first media content with the second media content, transmitting, at the radio frequency using the wireless transmitter, a second beacon signal that includes an identifier of the second media content, distinct from the identifier of the first media content.

Some embodiments of the present disclosure provide a computer system (e.g., a server system and/or a client device), comprising one or more processors and memory storing one or more programs. The one or more programs store instructions that, when executed by the one or more processors, cause the computer system to perform any of the methods described herein.

Some embodiments of the present disclosure provide a non-transitory computer readable storage medium storing instructions that, when executed by a computer system having one or more processors, cause the computer system to perform any of the methods described herein.

Thus, the systems and methods disclosed herein solve a shortcoming of internet-based advertising, namely that, as powerful as targeted advertising on the interest is, it is difficult to remarket products and services to which the consumer has been exposed through physical media. In addition, the disclosed embodiments solve this problem in a technical way, through the use of a beacon signal transmitted by the kiosk displaying the advertisement.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

FIGS. 7A-7B illustrate a flowchart of a method of transmitting beacon signals, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Figure 1:
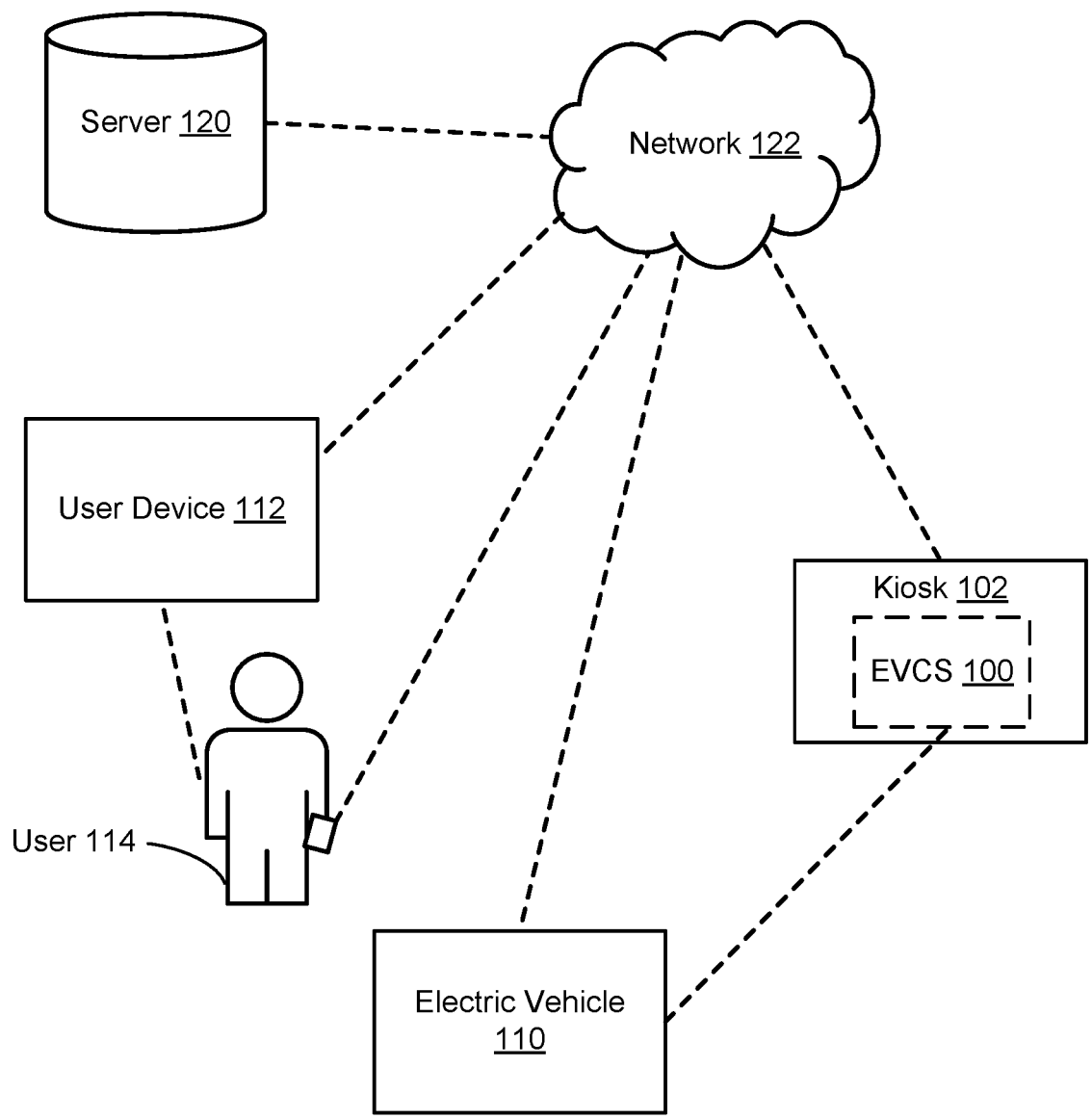
FIG. 1 illustrates a system for charging an electric vehicle in accordance with some embodiments.

FIG. 1 illustrates a kiosk 102 that is communicatively coupled to a server 120 via network 122. In some embodiments, the kiosk 102 comprises an electric vehicle charging station (EVCS) 100 that is configured to provide an electric charge to an electric vehicle 110 via one or more electrical connections. In some embodiments, the EVCS 100 provides an electric charge to electric vehicle 110 via a wired connection, such as a charging cable. Alternatively, the EVCS 100 may provide an electric charge to electric vehicle 110 via a wireless connection (e.g., wireless charging). In some embodiments, the EVCS 100 may be in communication with the electric vehicle 110 or a user device 112 belonging to a user 114. In some embodiments, user 114 is associated with the electric vehicle 110 (e.g., is a driver, passenger, owner, renter, or other operator of the electric vehicle 110). In some embodiments, user 114 is not associated with an electric vehicle, but the user 114 is located within a predefined geographic proximity to kiosk 102 (e.g., user 114 is a passerby near the kiosk). In some embodiments, the kiosk 102 communicates with one or more devices or computer systems, such as user device 112 or server 120, respectively, via a network 122.

Figure 2A:
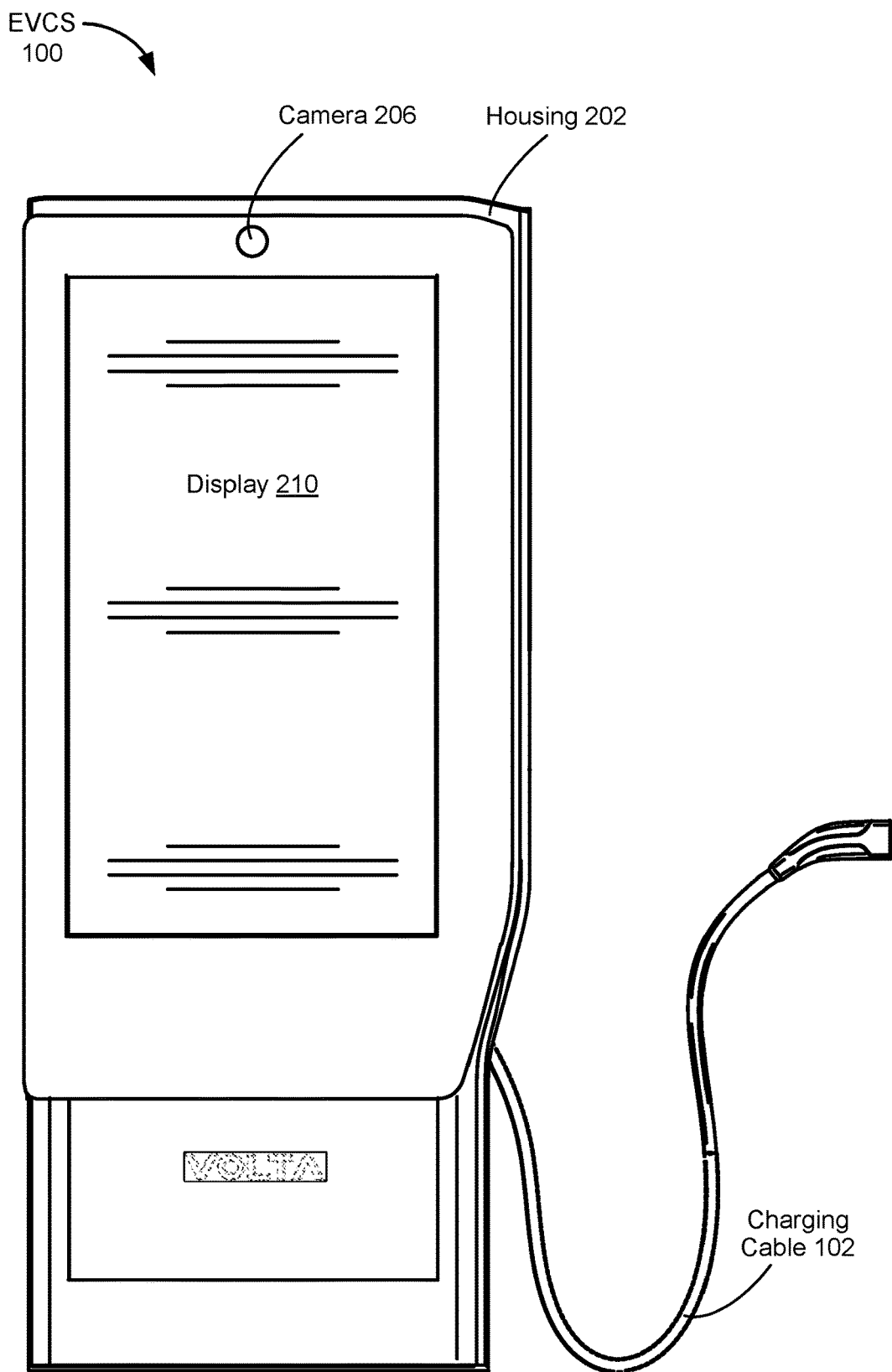
FIGS. 2A-2B illustrate a charging station for an electric vehicle in accordance with some embodiments.
Figure 2B:
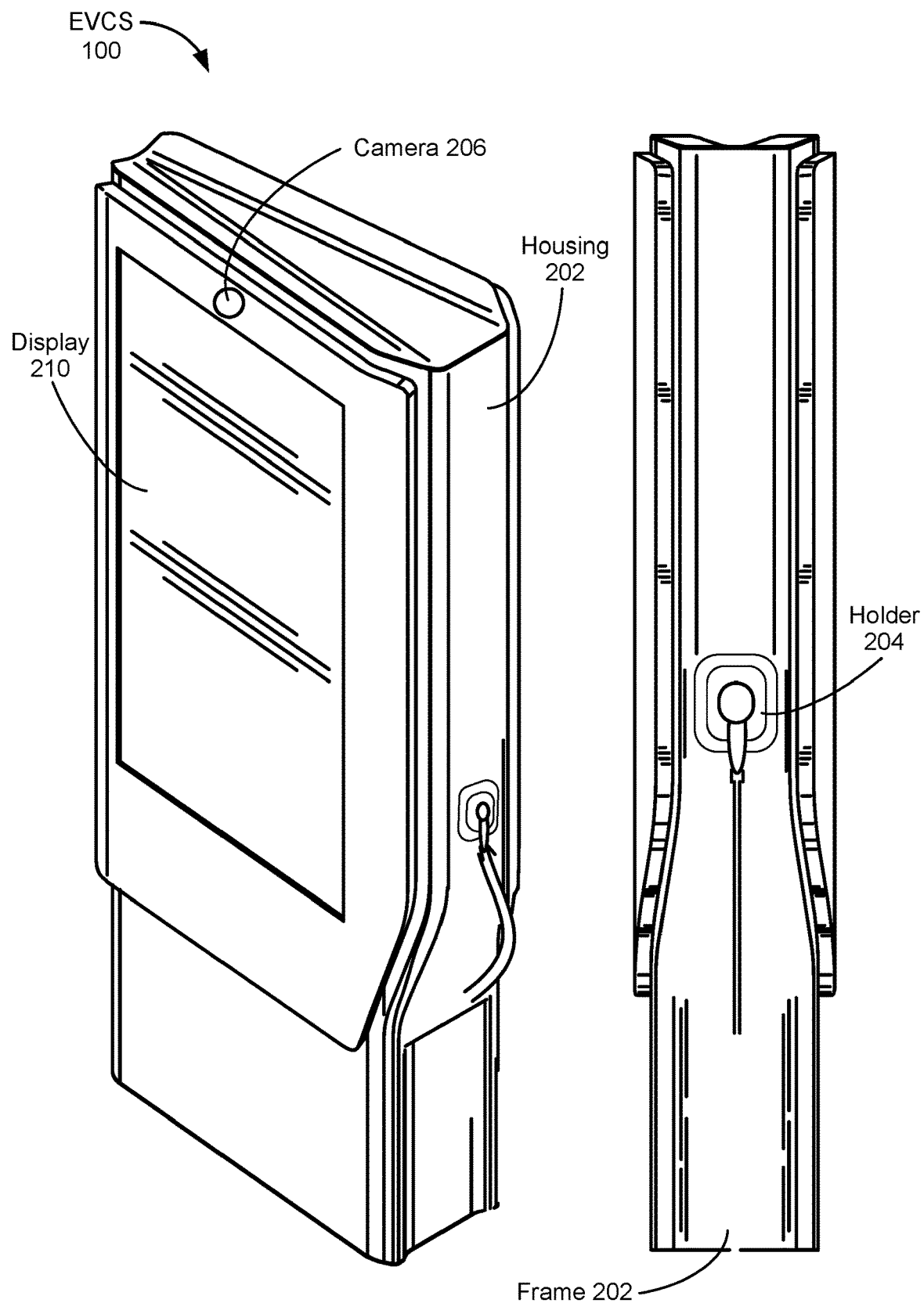

FIG. 2A is a mechanical drawing showing various views of an electric vehicle charging station (EVCS) 100, in accordance with some embodiments. FIG. 2B is a mechanical drawing showing additional views of the EVCS 100 of FIG. 2A, in accordance with some embodiments. In some embodiments, kiosk 102 comprises EVCS 100.

EVCS 100 includes a housing 202 (e.g., a body or a chassis) including a charging cable 102 (e.g., connector) configured to connect and provide a charge to an electric vehicle 110 (FIG. 1). An example of a suitable connector is an IEC 62196 type-2 connector. In some embodiments, the connector is a "gun-type" connector (e.g., a charge gun) that, when not in use, sits in a holder 204 (e.g., a holster). In some embodiments, the housing 202 houses circuitry for charging an electric vehicle 110. For example, in some embodiments, the housing 202 includes power supply circuitry as well as circuitry for determining a state of a vehicle being charged (e.g., whether the vehicle is connected via the connector, whether the vehicle is charging, whether the vehicle is done charging, etc.).

The EVCS 100 further includes one or more displays 210 facing outwardly from a surface of the EVCS 100. For example, the EVCS 100 may include two displays 210, one on each side of the EVCS 100, each display 210 facing outwardly from the EVCS 100. In some embodiments, the one or more displays 210 display messages (e.g., media content) to users of the charging station (e.g., operators of the electric vehicle) and/or to passersby that are in proximity to the EVCS 100. In some embodiments, the panel 106a (and/or panel 106b) has a height that is at least 60% of a height of the housing 202 and a width that is at least 90% of a width of the housing 202. In some embodiments, the panel 102 has a height that is at least 3 feet and a width that is at least 2 feet.

In some embodiments, the EVCS 100 includes one or more panels that hold a display 210. The displays are large compared to the housing 202 (e.g., 60% or more of the height of the frame and 80% or more of the width of the frame), allowing the displays 210 to function as billboards, capable of conveying information to passersby. In some embodiments, the displays 210 are incorporated into articulating panels that articulate away from the housing 202 (e.g., a sub-frame). The articulating panels solve the technical problem of the need for maintenance of the displays 210 (as well as one or more computers that control content displayed on the display). To that end, the articulating panels provide easy access to the entire back of the displays 210. In addition, in some embodiments, the remaining space between the articulating panels (e.g., within the housing 202) is hollow, allowing for ample airflow and cooling of the displays 210.

The EVCS 100 further includes a computer that includes one or more processors and memory. The memory stores instructions for displaying content on the display 210. In some embodiments, the computer is disposed inside the housing 202. In some embodiments, the computer is mounted on a panel that connects (e.g., mounts) a first display (e.g., a display 210) to the housing 202. In some embodiments, the computer includes a near-field communication (NFC) system that is configured to interact with a user's device (e.g., user device 112 of a user 114 of the EVCS 100).

In some embodiments, the EVCS 100 includes one or more sensors (not shown) for detecting whether external objects are within a predefined region (area) proximal to the housing. For example, the area proximal to the EVCS 100 includes one or more parking spaces, where an electric vehicle 110 parks in order to use the EVCS 100. In some embodiments, the area proximal to the EVCS 100 includes walking paths (e.g., sidewalks) next to the EVCS 100. In some embodiments, the one or more sensors are configured to determine a state of the area proximal to the EVCS 100 (e.g., wherein determining the state includes detecting external objects). The external objects can be living or nonliving, such as people, kids, animals, vehicles, shopping carts, (kids) toys, etc. The one or more sensors can detect stationary or moving external objects. The one or more sensors of the EVCS 100 include one or more image (e.g., optical) sensors (e.g., one or more cameras 206), ultrasound sensor, depth sensor, IR/RGB camera, PIR, heat IR, proximity sensors, radar, and a tension sensor. The one or more sensors may be connected to the EVCS 100 or a computer system associated with the EVCS 100 via wired or wireless connections such as via a Wi-Fi connection or Bluetooth connection.

In some embodiments, the housing 202 includes one or more lights configured to provide predetermined illumination patterns indicating a status of the EVCS 100. In some embodiments, at least one of the one or more lights is configured to illuminate an area proximal to the EVCS 100 as a person approaches the area (e.g., a driver returning to a vehicle or a passenger exiting a vehicle that is parked in a parking spot associated with the EVCS 100).

In some embodiments, the housing 202 includes one or more cameras 206 configured to capture one or more images of an area proximal to the EVCS 100. In some embodiments, the one or more cameras 206 are configured to obtain video of an area proximal to the EVCS 100. For example, a camera may be configured to obtain a video or capture images of an area corresponding to a parking spot associated with the EVCS 100. In another example, another camera may be configured to obtain a video or capture images of an area corresponding to a parking spot next to the parking spot of the EVCS 100. In a third example, the camera 206 may be a wide angle camera or a 360° camera that is configured to obtain a video or capture images of a large area proximal to the EVCS 100, including a parking spot of the EVCS 100. As shown in FIG. 2B, the one or more cameras 206 may be mounted directly on a housing 202 of the EVCS 100 and may have a physical (e.g., electrical, wired) connection to the EVCS 100 or a computer system associated with the EVCS 100. Alternatively, as shown in FIG. 2C, the one or more cameras 206 (or other sensors) may be disposed separately from but proximal to the housing 202 of the EVCS 100. In some embodiments, the camera 206 may be positioned at different locations on the EVCS 100 than what is shown in the figures. Further, in some embodiments, the one or more cameras 206 include a plurality of cameras positioned at different locations on the EVCS 100.

The EVCS 100 optionally includes a motor (e.g. motor 403, FIG. 4) within the housing 202. The motor, when energized, is configured to retract at least a portion of the charging cable 102. In some embodiments, the charging cable is retracted into the housing 202. In some embodiments, the charging cable is retracted into a spool external to the housing 202. In some embodiments, the charging cable is retracted into a separate housing. In some embodiments, the motor is energized when retraction criteria are met. For example, if the charging cable 102 is improperly returned to the housing 202 or if a user does not return the charging cable 102 to the housing 202, the motor is energized to retract at least a portion of the charging cable 102 into the housing 202. The charging cable 102 is retracted to prevent tripping hazards and to improve the overall experience of the user. In some embodiments, a determination that the retraction criteria are met is based on the data captured by the one or more sensors.

Figure 3:
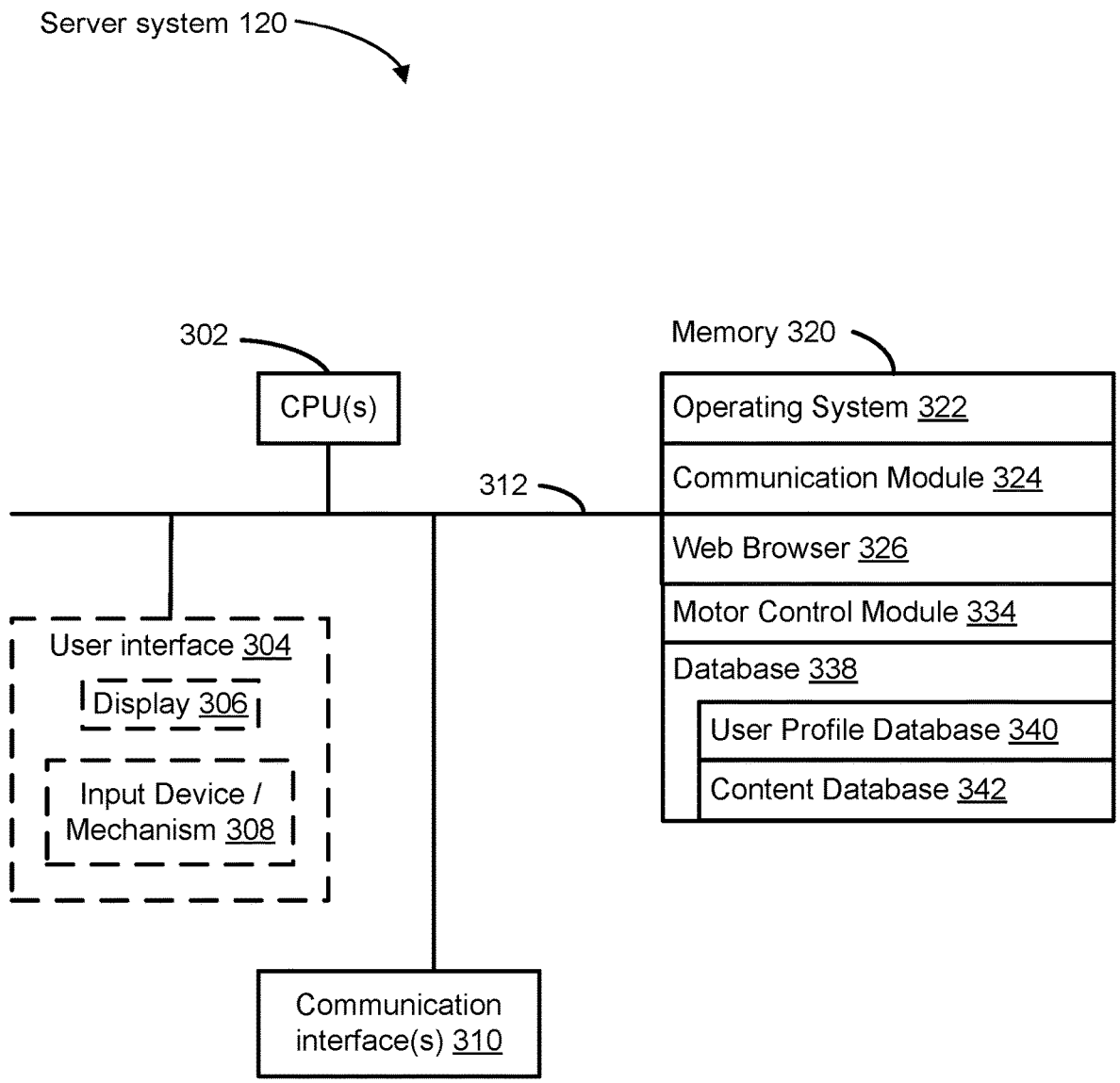
FIG. 3 is a block diagram of a server system in accordance with some embodiments.

FIG. 3 is a block diagram of a server system 120, in accordance with some embodiments. Server system 120 may include one or more computer systems (e.g., computing devices), such as a desktop computer, a laptop computer, and a tablet computer. In some embodiments, the server system 120 is a data server that hosts one or more databases (e.g., databases of images or videos), models, or modules or may provide various executable applications or modules. The server system 120 includes one or more processing units (processors or cores, CPU(s)) 302, one or more network or other communications network interfaces 310, memory 320, and one or more communication buses 312 for interconnecting these components. The communication buses 312 optionally include circuitry (sometimes called a chipset) that interconnects and controls communications between system components. The server system 120 typically includes a user interface 304. The user interface 304 may include a display device 306 (e.g., a screen or monitor). In some embodiments, the server system 120 includes one or more input devices 308 such as a keyboard, mouse, and/or other input buttons. Alternatively or in addition, in some embodiments, the display device 306 includes a touch-sensitive surface, in which case the display device 306 is a touch-sensitive display.

Figure 4:
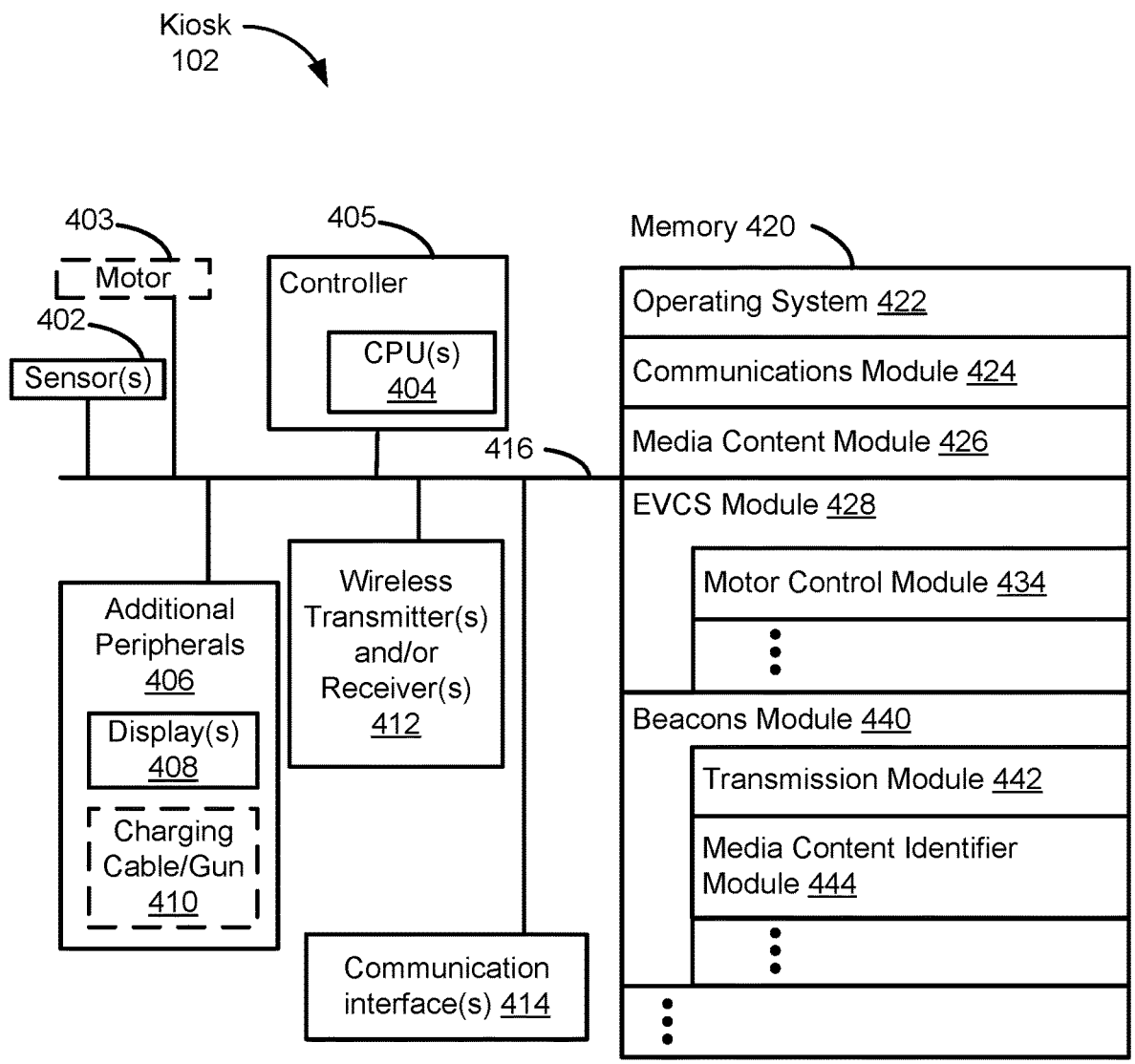
FIG. 4 is a block diagram of a kiosk in accordance with some embodiments.

The memory 320 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some embodiments, the memory 320 includes one or more storage devices remotely located from the processors 302. The memory 320, or alternatively the non-volatile memory devices within the memory 320, includes a non-transitory computer-readable storage medium. In some embodiments, the memory 320 or the computer-readable storage medium of the memory 320 stores the following programs, modules, and data structures, or a subset or superset thereof:

- an operating system 322, which includes procedures for handling various basic system services and for performing hardware dependent tasks;
- a communications module 324, which is used for connecting the server system 120 to other computers and devices via the one or more communication network interfaces 310 (wired or wireless), such as the internet, other wide area networks, local area networks, metropolitan area networks, and so on;
- a web browser 326 (or other application capable of displaying web pages), which enables a user to communicate over a network with remote computers or devices;
- a motor control module 334 that includes one or more instructions for energizing or forgoing energizing the motor of an EVCS (e.g., in some embodiments, data from one or more sensors at or near an EVCS is passed to the server system 120, which makes a decision as to whether to retract the cable and returns the decision to the EVCS 100);
- database 338, including data structures corresponding to one or more of:
  - user profile database 340 for storing information about a user, such as profile information, device information, and historical information related to content consumption; and
  - content database 342 for storing and/or selecting one or more media content items, such as images for display at one or more displays (e.g., display(s) 408, FIG. 4).

In some embodiments, the memory 320 may store thresholds and other criteria, which are compared against metrics and/or characteristics determined from a processed image or data from one or more sensors of an EVCS 100.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 320 stores a subset of the modules and data structures identified above. Furthermore, the memory 320 may store additional modules or data structures not described above.

Although FIG. 3 shows a server system 120, FIG. 3 is intended more as a functional description of the various features that may be present rather than as a structural schematic of the embodiments described herein. In practice, and as recognized by those of ordinary skill in the art, items shown separately could be combined and some items could be separated.

FIG. 4 is a block diagram of a kiosk 102 (FIG. 1), in accordance with some embodiments. In some embodiments, the kiosk 102 is an EVCS. The EVCS 100 typically includes a motor 403 (configured to retract a portion of a charging cable). The kiosk 102 includes a controller 405 that includes one or more processing units (processors or cores) 404, one or more network or other communications network interfaces 414, memory 420, one or more wireless transmitter(s) and/or receiver(s) 412, one or more sensors 402, additional peripherals 406, and one or more communication buses 416 for interconnecting these components. The communication buses 416 optionally include circuitry (sometimes called a chipset) that interconnects and controls communications between system components. In some embodiments, the memory 420 stores instructions for performing (by the one or more processing units 404) a set of operations, including determining a status of the kiosk 102, wherein the status indicates, for example, whether a person and/or object is near the kiosk, or a state of an electric vehicle 110 at the kiosk (e.g., EVCS). Note that the controller used to energize the motor to retract a portion of the charging cable may be the same or different from the controller that controls other operations of the kiosk 102 (e.g., controls animations). In addition, in various embodiments, the controller used to energize the motor may be embodied as one or more processors or cores, a field programmable gate array (FPGA) or an application specific integrated circuit (ASIC). Moreover, the controller may be embodied as software, hardware, firmware, or a combination thereof.

Kiosk 102 typically includes additional peripherals 406 such as one or more displays (e.g., displays 210 shown in FIGS. 2A and 2B) for displaying content, and a charging cable 410 (e.g., charging cable 102 shown in FIGS. 2A-2B, also referred to as a charging gun) for connecting the kiosk 102 (e.g., EVCS 100) to an electric vehicle for charging the electric vehicle. In some embodiments, the displays 408 may be touch-sensitive displays that is configured to detect various swipe gestures (e.g., continuous gestures in vertical and/or horizontal directions) and/or other gestures (e.g., a single or double tap) or to detect user input via a soft keyboard that is displayed when keyboard entry is needed.

The kiosk 102 may also include one or more sensor(s) 402 such as cameras (e.g., camera 206, described above with respect to FIGS. 2A-2B), ultrasound sensors, depth sensors, infrared cameras, visible (e.g., RGB or black and white) cameras, passive infrared sensors, heat detectors, infrared sensors, proximity sensors, or radar. In some embodiments, the one or more sensor(s) 402 are for detecting whether external objects are within a predefined region proximal to the kiosk, such as living and nonliving objects, and/or the status of the EVCS 100 (e.g., available, occupied, etc.) in order to perform an operation, such as retracting the charging cable safely and carefully.

The memory 420 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some embodiments, the memory 420 includes one or more storage devices remotely located from the processors 404, such as database 338 of server system 120 that is in communication with the kiosk 102. The memory 420, or alternatively the non-volatile memory devices within the memory 420, includes a non-transitory computer-readable storage medium. In some embodiments, the memory 420 or the computer-readable storage medium of the memory 420 stores the following programs, modules, and data structures, or a subset or superset thereof:

- an operating system 422, which includes procedures for handling various basic system services and for performing hardware dependent tasks;
- a communications module 424, which is used for connecting the EVCS 100 to other computers and devices via the one or more communication network interfaces 414 (wired or wireless), such as the internet, other wide area networks, local area networks, metropolitan area networks, and so on;
- a media content module 426 for storing and/or selecting media content to be displayed for passersby and users of the kiosk 102;
- an EVCS module 428 for the kiosk to function as a charging station, including controlling charging an electric vehicle (e.g., measuring how much charge has been delivered to an electric vehicle, commencing charging, ceasing charging, etc.), including:
    - motor control module 434 that includes one or more instructions for energizing or forgoing energizing the motor; and
- a beacon module 440 for storing and/or updating beacons in accordance with currently displayed media content, including one or more of:
    - transmission module 442 for transmitting beacon signals using wireless transmitter(s); and
    - media content identifier module 444 for storing and/or assigning one or more identifiers associated with media content to be displayed at the kiosk, wherein a respective beacon signal includes a respective identifier for the media content associated with the beacon signal.

In some embodiments, the memory 420 stores metrics, thresholds, and other criteria, which are compared against the measurements captured by the one or more sensors 402. For example, data obtained from a PIR sensor of the one or more sensors 402 can be compared with baseline data to detect that an object is in proximity the kiosk 102.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 420 stores a subset of the modules and data structures identified above. Furthermore, the memory 420 may store additional modules or data structures not described above.

Although FIG. 4 shows a kiosk 102, FIG. 4 is intended more as a functional description of the various features that may be present rather than as a structural schematic of the embodiments described herein. In practice, and as recognized by those of ordinary skill in the art, items shown separately could be combined and some items could be separated.

Figure 5:
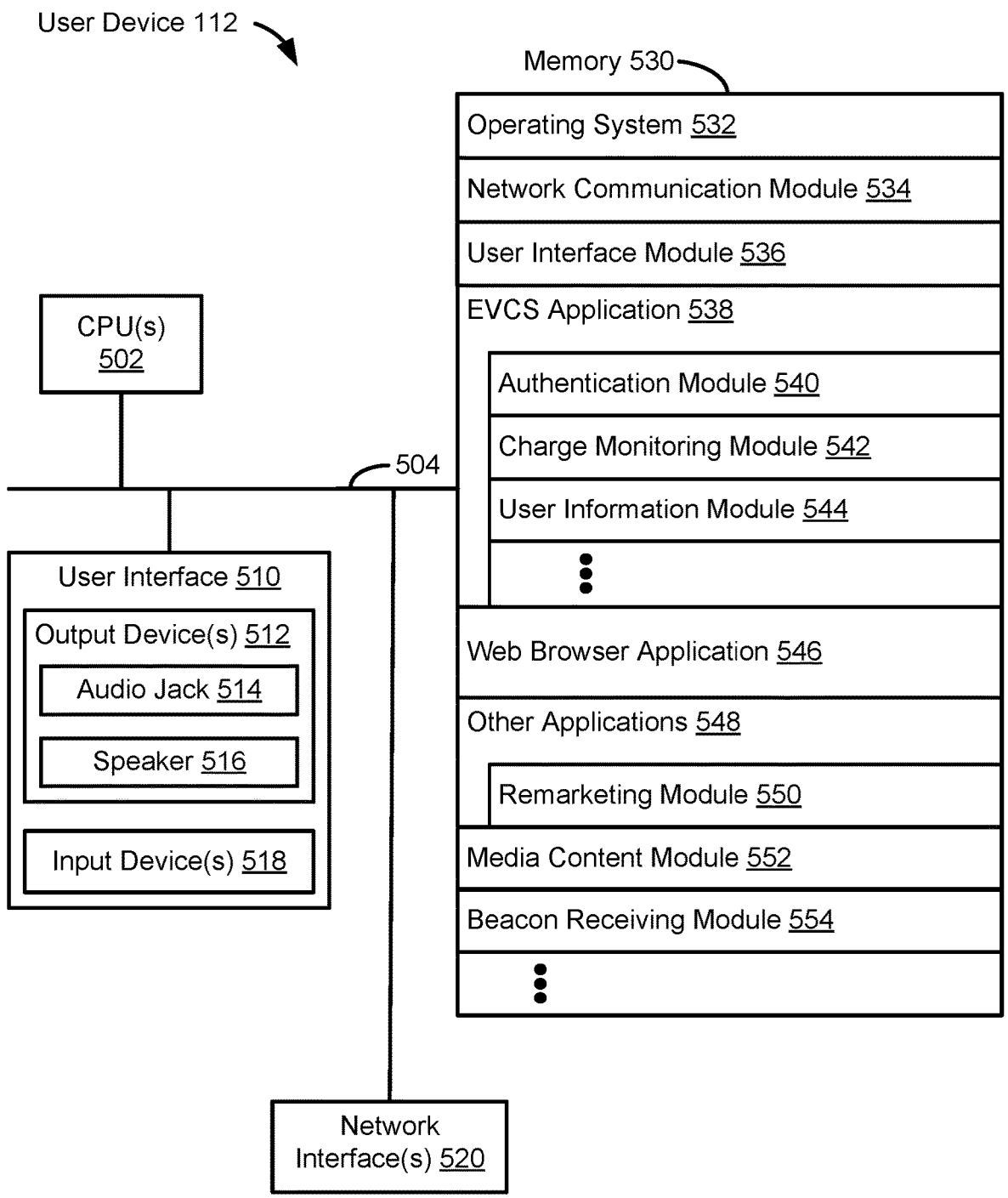
FIG. 5 is a block diagram of a user device in accordance with some embodiments.

FIG. 5 is a block diagram of a user device 112 of a user 114 in accordance with some embodiments. In some embodiments, the term "user" is used to refer to any person having a client device that comes into proximity (e.g., within a 10 foot radius) of the kiosk. In some embodiments, the user 114 is a passerby who passes the display of the kiosk (e.g., and views the media content displayed at the kiosk). In some embodiments, user 114 is associated with (e.g., an operator of) an electric vehicle 110 at the kiosk (e.g., when the kiosk is EVCS 100). Various examples of the computing device 112 include a cellular-capable smart device such as a smartphone, a smart watch, a laptop computer, a tablet computer, and other computing devices that have a processor capable of connecting to the kiosk 102 via a communications network (e.g., network 122).

The user device 112 typically includes one or more processing units (processors or cores) 502, one or more network or other communications network interfaces 520, memory 530, and one or more communication buses 504 for interconnecting these components. The communication buses 504 optionally include circuitry (sometimes called a chipset) that interconnects and controls communications between system components. The user device 112 typically includes a user interface 510. The user interface 510 typically includes a display (e.g., a screen or monitor). In some embodiments, the user device 112 includes input devices 518 such as a keyboard, mouse, and/or other input buttons. Alternatively or in addition, in some embodiments, the user device 112 includes a touch-sensitive surface, in which case the display is a touch-sensitive display. In some embodiments, the touch-sensitive surface is configured to detect various swipe gestures (e.g., continuous gestures in vertical and/or horizontal directions) and/or other gestures (e.g., single/double tap). In computing devices that have a touch-sensitive surface (e.g., a touch-sensitive display), a physical keyboard is optional (e.g., a soft keyboard may be displayed when keyboard entry is needed). Furthermore, user device 112 may also include a microphone and voice recognition software to supplement or replace the keyboard. The user interface 510 also includes one or more output devices 512 such as an audio output device 514, such as speakers 516 or an audio output connection 514 (e.g., audio jack) for connecting to speakers, earphones, or headphones.

The memory 530 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some embodiments, the memory 530 includes one or more storage devices remotely located from the processors 502. The memory 530, or alternatively the non-volatile memory devices within the memory 530, includes a non-transitory computer-readable storage medium. In some embodiments, the memory 530 or the computer-readable storage medium of the memory 530 stores the following programs, modules, and data structures, or a subset or superset thereof:

- an operating system 532, which includes procedures for handling various basic system services and for performing hardware dependent tasks;
- a network communication module 534, which is used for connecting the user device 112 to other computers and devices via the one or more communication network interfaces 520 (wired or wireless), such as the internet, other wide area networks, local area networks, metropolitan area networks, and so on;
- user interface module 536 for providing user interfaces for the user to interact with the user device 112 via applications on the user device 112 and the operating system 532 of the user device 112;
- EVCS application 538 for communicating with an EVCS 100 (or kiosk 102) or a server system that supports the EVCS 100 (or kiosk 102). The EVCS application 538 includes authentication module 540 for authenticating the user device 112, so that the user device 112 can access (e.g., log into) a user profile (e.g., user account) on the EVCS application 538, a charge monitoring module 542 for providing updates on a charge status of an electric vehicle 110 that is associated with the user profile and using (e.g., plugged into, being charged by, parked at) EVCS 100 (e.g., status updates such as "Your vehicle is 70% charged", "Your vehicle has completed charging", "Your vehicle is fully charged", "Your free-charge time is up in 15 minutes"), and a user information module 544 that allows a user to create, delete, or update their profile (e.g., a user may update a profile to include a make and model of their vehicle);
- a web browser application 546 for accessing the internet and accessing websites on the internet, including providing functionalities on the EVCS application 538 via a website accessed through web browser application 550;
- other applications 548 that the user 114 may have installed on the user device 112 or that may have been included as default applications on the user device 112, wherein at least one of the other applications 548 includes remarketing module 550 for sending user information to a server system to remarket;
- media content module 552 for displaying and tracking media content that is accessed by the user, including media content displayed in one or more applications (e.g., other applications 548); and
- beacon receiving module 554 for receiving a beacon signal (e.g., transmitted at a radio frequency) and processing the signal.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 530 stores a subset of the modules and data structures identified above. Furthermore, the memory 530 may store additional modules or data structures not described above.

Although FIG. 5 shows a user device 112, FIG. 5 is intended more as a functional description of the various features that may be present rather than as a structural schematic of the embodiments described herein. In practice, and as recognized by those of ordinary skill in the art, items shown separately could be combined and some items could be separated.

Figure 6:
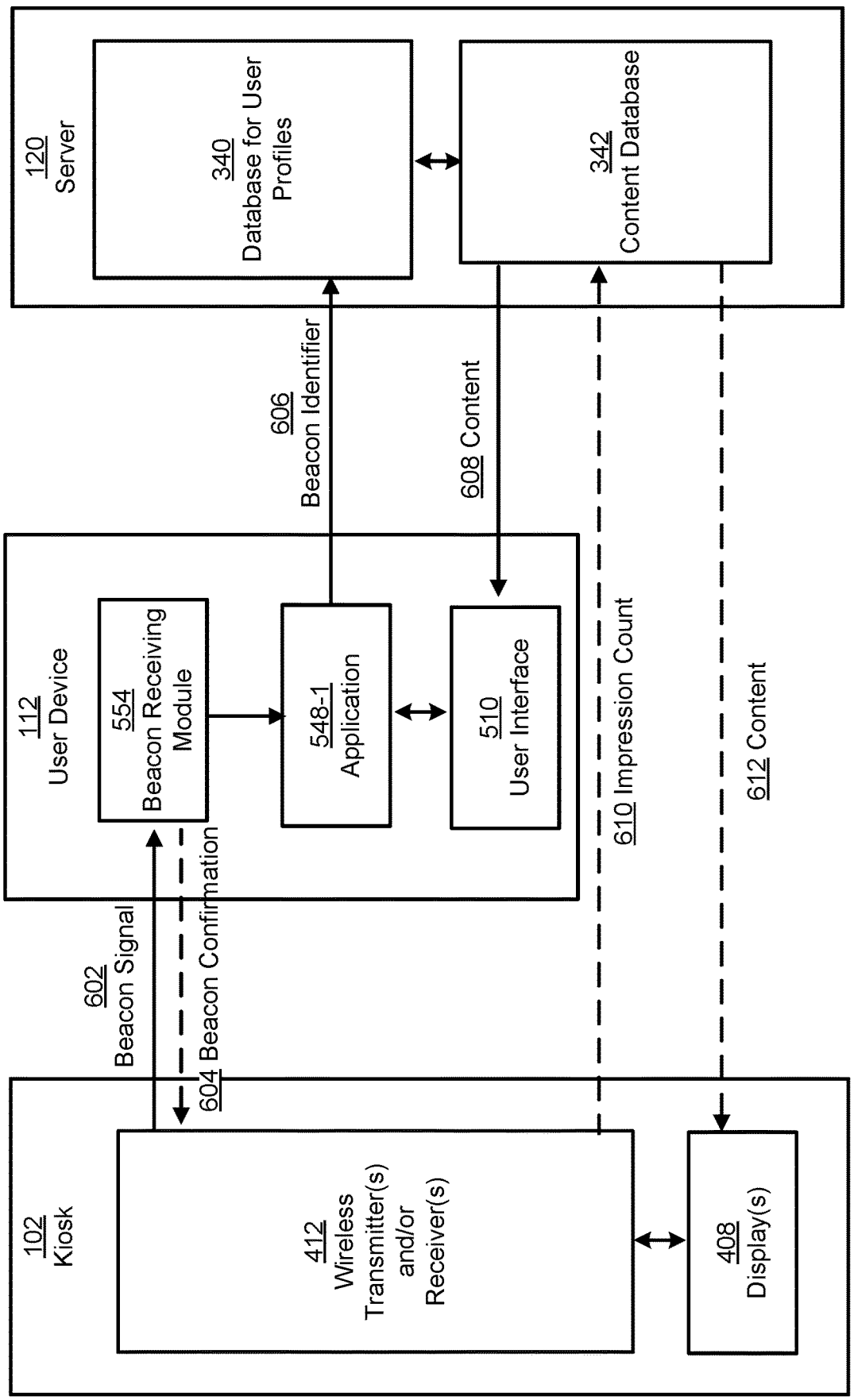
FIG. 6 illustrates transmission of a beacon signal from a kiosk to a user device and server in accordance with some embodiments.

FIG. 6 illustrates a method of transmitting a beacon signal from kiosk 102. In some embodiments, kiosk 102 includes wireless transmitter(s) and/or wireless receiver(s) 412. In some embodiments, the wireless transmitter(s) are configured to transmit signals at radio frequencies. For example, the kiosk 102 is an electric vehicle charging station (e.g., EVCS 100). In some embodiments, wireless transmitter 412 comprises a beacon. For example, the wireless transmitter transmits a beacon signal 602. In some embodiments, the beacon signal 602 comprises a signal transmitted at a radio frequency (RF). In some embodiments, the beacon signal 602 corresponds to content that is displayed at kiosk 102 (e.g., on display(s) 408) at the time that beacon signal 602 is transmitted. For example, the kiosk 102 displays content received from a content database 342 at a server 120. In some embodiments, the content comprises one or more images and/or text and is associated with a first party. For example, the first party is associated with promotional content.

In some embodiments, display 408 periodically rotates (e.g., changes) the content that is displayed at the kiosk. For example, a plurality of content items are received from content database 342, and the kiosk displays a first media content item of the plurality of content items for a first predetermined time period (e.g., 3 minutes, 5 minutes, 10 minutes, etc.). In some embodiments, the plurality of content items include content 612 received from the server 120. In some embodiments, the kiosk cycles through the content items. For example, the kiosk ceases displaying the first media content item and replaces display with a second content item of the plurality of content items. In some embodiments, the content that is displayed is selected by the kiosk using a machine learning algorithm and/or using a status of the kiosk (e.g., as determined by one or more sensors at the kiosk). For example, the status represents whether an electric vehicle is present at the EVCS 100 (e.g., and the content is selected based on a type of electric vehicle). It will be understood that the content items displayed at the display(s) 408 can be selected based on other factors.

In some embodiments, the beacon signal 602 corresponds to the media content item that is currently displayed on display(s) 408. For example, a first beacon signal is transmitted while display 408 displays first media content, and a second beacon signal (e.g., distinct from the first beacon signal) is transmitted while display 408 displays second media content. Accordingly, as the display changes the media content item that is displayed, the beacon signal is also updated such that the wireless transmitter only transmits a beacon signal that corresponds to the currently displayed media content. In some embodiments, the beacon signal 602 includes an identifier of the associated media content (e.g., the identifier is encoded as bits in the beacon signal). For example, server 120 provides content 612 to be displayed at display 408 of kiosk 102. When kiosk 102 displays the content 612 on display 408, the kiosk 102 transmits a beacon signal 602 that is associated with the content 612 that is currently displayed. For example, the beacon signal 602 includes a content identifier corresponding to the content 612.

In some embodiments, the beacon signal 602 is received by a user device 112 (e.g., at beacon receiving module 554). For example, the user device includes a beacon receiving module 554 (e.g., and an antenna for receiving an RF signal). In some embodiments, user device 112 must be within a predefined geographic proximity to the kiosk in order to receive the beacon signal 602. For example, the user device 112 must be within range of the beacon (e.g., within a 10 foot radius) in order to receive beacon signal 602. In some embodiments, the range of the beacon is defined as a distance that is less than the maximum possible range for transmitting a beacon signal. For example, although some beacons are capable of transmitting a beacon signal more than 10 feet, the beacon signal is only transmitted to reach a user device 112 within a predefined geographic proximity to the kiosk (e.g., such that only user devices that are within the predefined range are enabled to receive the signal).

In some embodiments, wireless transmitter(s) 412 perform beam forming or otherwise direct the beacon signal(s) in a particular direction. For example, the particular direction is a direction in front of the electronic display (e.g., where a user would be able to see the content on the electronic display). In some embodiments, wireless transmitter(s) 412 transmits the beacon signals radially (e.g., any user device 112 is enabled to receive the signal within a geographical radius from the transmitter).

In some embodiments, user device 112 is a mobile phone, computer, tablet, or any other device that is enabled to receive a beacon signal 602. In some embodiments, user device 112 is associated with a person. It will be understood that a user associated with a user device 112 need not be a user of the kiosk 102. For example, the user associated with user device 112 is a passerby. In some embodiments, the user associated with user device 112 is a user of the kiosk (e.g., a driver of an electric vehicle that uses the EVCS 100 to charge the driver's electric vehicle).

In some embodiments, user device 112 includes applications 548, including an application 548-1, that is executing at the user device 112. In some embodiments, the application 548-1 is executing in the background of user device 112. In some embodiments, the application 548-1 is associated with kiosk 102. For example, application 548-1 comprises an EVCS application used to communicate with EVCS 100 (e.g., kiosk 102). In some embodiments, application 548-1 is not an EVCS application, and the application 548-1 is associated with a third-party (e.g., a third-party associated with server 120, wherein the third-party associates with a plurality of applications to enable data sharing between the plurality of applications). For example, in some embodiments, application 548-1 is an application that runs an SDK associated with the third-party. In some embodiments, user device 112 includes additional applications (e.g., stored and/or executed on a same device) that are associated with the third-party. By enabling the beacon to be processed by an application that is not associated with the kiosk (e.g., or EVCS), the system is enabled to remarket media content to the individuals who have downloaded an application associated with the kiosk as well as individuals who have not downloaded a particular application associated with the kiosk on their device.

In some embodiments, in response to receiving beacon signal 602, user device 112 transmits a beacon confirmation 604 back to the kiosk 102. In some embodiments, in response to the kiosk receiving a beacon confirmation 604, the kiosk transmits an impression count 610 to server 120. For example, the beacon confirmation 604 allows the kiosk 102 to track a number of user devices 112 that have confirmed receiving the beacon signal 602. This number can be shared with the server 120 such that the kiosk gets credit for displaying the content for a particular number of people (e.g., which can be used to determine advertising revenue). This improves the current estimations of how many people have been exposed to particular content and allows the kiosk to better track the amount of user traffic near the kiosk (e.g., instead of relying on estimates).

In some embodiments, user device 112 sends (e.g., or forwards) beacon identifier 606 to server 120 (e.g., a server system). In some embodiments, the beacon identifier is a same beacon identifier that is included in beacon signal 602. In some embodiments, the beacon identifier includes information such as the content that is associated with beacon signal 602, a party associated with the content, a kiosk identifier that identifies the kiosk 102, or any other information that is related to beacon signal 602. In some embodiments, the user device 112 (e.g., an application 548) generates and/or identifies the beacon identifier 606 from the beacon signal 602, and transmits the generated beacon identifier 606 to server 120. In some embodiments, beacon identifier 606 includes information about the user device 112 (e.g., the user associated with user device 112) in addition to the information about the content (e.g., retrieved from beacon signal 602). For example, the application 548-1 (e.g., a software development kit (SDK) of the application) at user device 112 recognizes the beacon signal 602 and transmits beacon identifier 606 to the server 120 such that the server 120 can track which beacon signals have been received at the particular user device 112. In some embodiments, the SDK of the application is running in the background of the user device 112 (e.g., as controlled by application settings at the user device 112). In some implementations, a plurality of applications associated with different parties are capable of processing beacon signal 602. For example, the plurality of applications have an agreement with the party associated with kiosk 102 such that the applications recognize beacon signal 602 when the user device 112 receives the signal.

In some embodiments, in response to receiving a beacon identifier 606 from user device 112 (e.g., and/or in response to receiving impression count 610 from the kiosk 102), the server 120 stores (e.g., tracks and counts) a number of times a particular beacon identifier is received. For example, the beacon identifier includes (i) a user identifier of the user device 112 (e.g., of the user associated with user device 112) and (ii) an identifier of the content that was displayed at display 408 on the kiosk (e.g., where the beacon signal 602 includes the identifier of the content). In some embodiments, server 120 stores, in the database for user profiles 340, the user identifier of the user associated with user device 112 in association with the information. The server 120 is thus enabled to track that a particular user identifier has been exposed to particular content, as determined by the content associated with beacon signal 602. In some embodiments, the server stores an impression count (e.g., associated with an identifier for first content) as determined by a number of times a beacon identifier 606 (e.g., that is associated with the identifier for the first content) is received from a user device.

In some embodiments, server 120 includes a content database 342. In some embodiments, content database 342 and database for user profiles 340 are stored at different servers that belong to a same server system. In some embodiments, database 342 and database 340 are separate servers associated with distinct parties (e.g., that may or may not be in communication with each other). In some embodiments, the server 120 sends content 608 to user device 112 for display at user interface 510.

In some embodiments, the server 120 selects (e.g., determines) the content 608 from content stored at the content database 342 to transmit to the user device 112. In some embodiments, content 608 is selected based on the data stored in database for user profiles 340. For example, content database 342 selects to send content related to the content associated with the beacon signal 602 to be displayed at the user interface 510 of user device 112. This way, a user of user device 112 is exposed to similar content (e.g., from a same party) multiple times: at the display of the kiosk 102 and then at the user interface 510 of the user device 112. The system thus enables the tracking of a particular user's physical exposure to content, and allows a server to select additional (e.g., either related or the same) content to send to the user device 112 based on the user's physical exposure. For example, the server is enabled to remarket (e.g., re-target) content to a user that the user has already been exposed to in the physical world (e.g., at the kiosk) by presenting related content to the user at the user's own device (e.g., in digital media). It will be understood that the time between the user's physical exposure (e.g., as determined by receipt of beacon signal 602) and the time content 608 is presented to the user may be a short period of time (e.g., within 5 minutes) or may be a long period of time (e.g., after a week or a month). In some implementations, content 608 is transmitted to a user based on a number of times the user has already been exposed to a plurality of content items related to content 608. For example, the server 120 waits a predefined time period before sending content 608 (e.g., which is related to the content identified in beacon signal 602), and/or the server 120 waits until it has determined the user associated with user device 112 has been exposed to related content at least a number of times (e.g., at least 3 times, at least 5 times, etc.). For example, database 340 tracks user exposure to content in addition to the content displayed at kiosk 102. For example, in addition to receiving beacon identifier 606, the server 120 receives updates from content the user has viewed on the display of user device 112 and/or content the user has viewed on other user devices that are associated with a same user. Thus, the server improves its selection of content 608 to send to the user device 112 based on related content that the user has consumed (e.g., including from kiosk 102, other kiosks, and other user devices associated with the user).

Figure 7A:
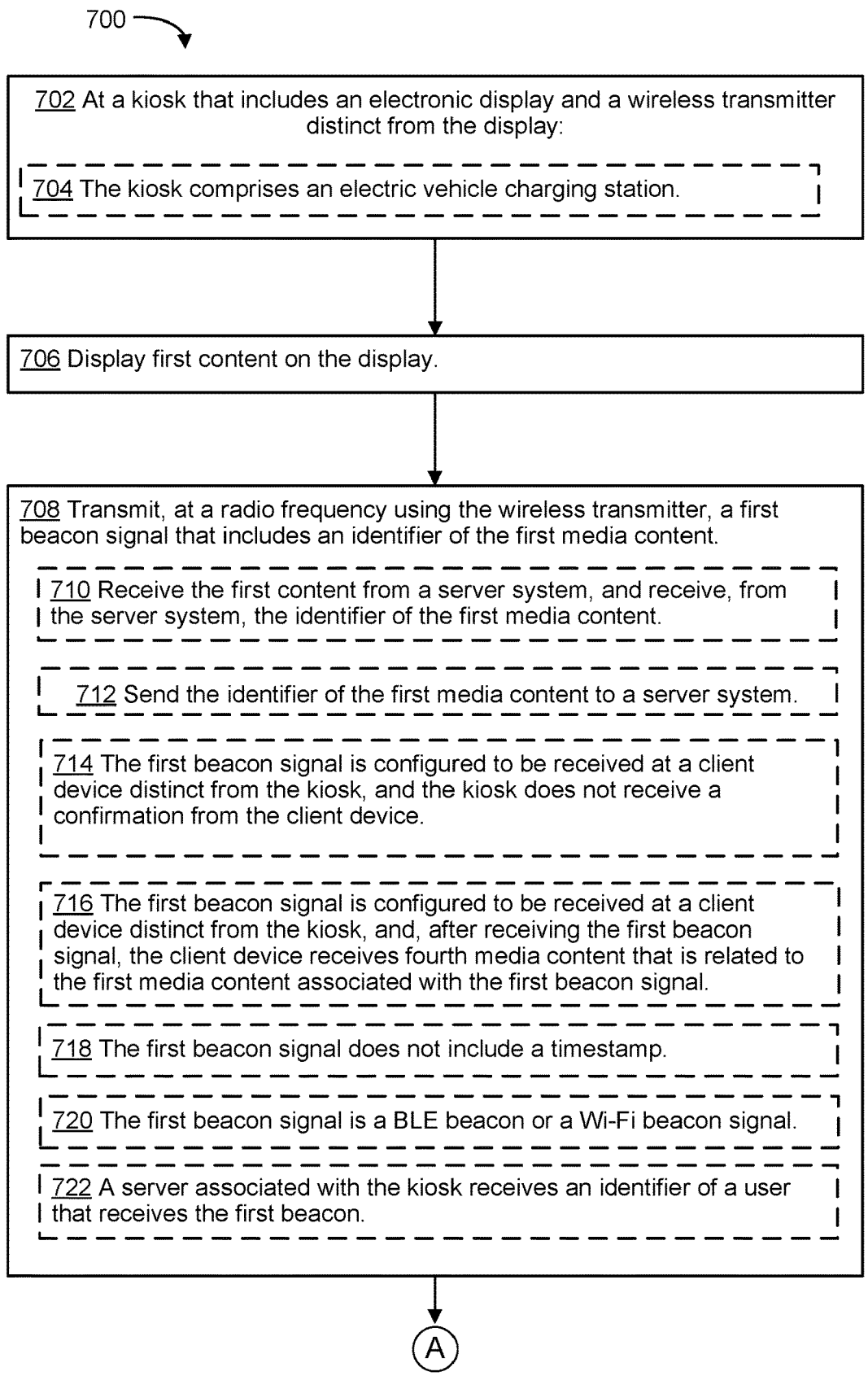

FIGS. 7A-7B illustrate a flowchart of a method 700 of transmitting beacon signals from a kiosk (e.g. kiosk 102, FIG. 1), in accordance with some embodiments. The method 700 is performed (702) at the kiosk 102. The kiosk includes an electronic display and a wireless transmitter distinct from the display. In some embodiments, a computer system (e.g., a computer system corresponding to server 120) is in communication and configured to work in conjunction with the kiosk 102. The computer system includes one or more processors (e.g., CPU(s) 302) and memory 320).

In some embodiments, the kiosk comprises (704) an electric vehicle charging station. For example, as illustrated in FIG. 1, the kiosk 102 comprises EVCS 100. In some embodiments, the kiosk includes at least a portion of the features of the EVCS described with reference to FIGS. 2A-2B. In some embodiments, the kiosk is at least 5 feet tall (or at least 3 feet tall). In some embodiments, the display on the kiosk is large (e.g., the display takes up an area that is at least 60% of the kiosk wall to which it is attached).

The kiosk displays (706) first media content on the display. For example, the first media content comprises a first image that is associated with a first party. In some embodiments, the first media content is received from content database 342 (e.g., server 120). For example, as explained with reference to FIG. 6, content 612 is received from server 120 to be displayed at display 408 of the kiosk 102.

The kiosk transmits (708), at a radio frequency using the wireless transmitter, a first beacon signal that includes an identifier of the first media content. For example, as illustrated in FIG. 6, beacon signal 602 is transmitted by kiosk 102. In some embodiments, the first beacon signal is transmitted for as long as the first media content is displayed on the display. For example, the kiosk transmits (e.g., using wireless transmitter(s) 412) the beacon signal that includes the identifier of the first media content beginning when the first media content is displayed on the display, and ceases to transmit the beacon signal that includes the identifier of the first media content in accordance with a determination that the first media content is no longer displayed on the display. In some embodiments, the identifier of the first media content comprises the first party that is associated with the first media content. For example, the first party is associated with a plurality of content items and each content item includes an identifier that includes the identifier of the first party. In some embodiments, each content item has a unique identifier (e.g., even content items that are associated with the same first party include distinct identifiers that are unique to the respective content item).

In some embodiments, the kiosk receives (710) the first media content from a server system, and receives, from the server system, the identifier of the first media content. For example, with reference to FIG. 6, content 612 is transmitted by server 120 to kiosk 102. In some embodiments, content 612 includes an identifier for content 612 (e.g., the identifier for the content is embedded in the content 612, or can be transmitted separately). In some embodiments, the kiosk does not generate the identifier for the respective media content items. In some embodiments, the media content is updated. For example, the server system updates the media content by sending other content to kiosk 102. In some embodiments, kiosk 102 stores a plurality of content items received from the server, and the content items stored at the kiosk are determined by the server system. For example, the server system determines if all or a portion of the media content stored at the kiosk are replaced with new content items, and the server system sends the new content items to the kiosk 102. In some embodiments, after receiving the content from a server and displaying the new content, the kiosk updates the beacon signals such that the beacon signals correspond to the new content (e.g., the beacon signals include information related to the new content items).

In some embodiments, the kiosk sends (712) the identifier of the first media content to a server system. For example, as illustrated in FIG. 6, kiosk 102 transmits an impression count 610 (e.g., which includes the identifier of the first media content) to server 120. In some embodiments, impression count 610 includes the identifier of a currently displayed media content item. In some embodiments, kiosk 102 transmits the identifier of the first media content to the server system to indicate to the server system that the first media content is displayed at the kiosk. In some embodiments, kiosk 102 transmits the identifier of the first media content to the server system in response to receiving beacon confirmation 604. For example, the kiosk 102 sends an indication to the server system in accordance with a determination that a user device 112 has received the beacon signal (e.g., in order to update the server that this user has been exposed to the media content item). In some embodiments, the identifier of the first media content is the same identifier received from the server system. For example, the kiosk receives the first media content and receives the identifier of the first media content, and the kiosk sends the identifier back to the server in accordance with a determination that a user device has received the beacon signal.

In some embodiments, the kiosk generates the identifier of the first media content. For example, the kiosk receives the first media content from content database 342 (e.g., without an identifier for the first media content), and kiosk 102 generates the identifier to include identifying information about the first media content (e.g., wherein the identifying information is determined based which server provided the content). In some embodiments, the kiosk receives the identifier of the first media content from a server. For example, the kiosk receives the identifier of the first media content item and the first media content item from server 120.

In some embodiments, the first beacon signal is configured to be received (714) at a client device distinct from the kiosk, and the kiosk does not receive a confirmation from the client device. For example, with reference to FIG. 6, the beacon signal 602 is received at user device 112 (e.g., without user device 112 sending beacon confirmation 604 to the kiosk 102).

In some embodiments, the first beacon signal is configured to be received (716) at a client device distinct from the kiosk, and, after receiving the first beacon signal, the client device receives fourth media content that is related to the first media content associated with the first beacon signal. For example, after user device 112 receives beacon signal 602, the user device 112 receives content 608. In some embodiments, content 608 is associated with a same party as the first media content (e.g., content 612). In some embodiments, content 608 is related to the first media content based on other characteristics of the content items (e.g., other than the associated party), for example, particular interests, themes, or products that are related.

In some embodiments, the first beacon signal does not include (718) a timestamp. For example, using a rotating beacon (e.g., a beacon signal that is updated with an identifier corresponding to the currently displayed media content) is preferable to transmitting a beacon signal that includes a time stamp because there could be delays in time stamp that could place it out of sync with media content. For example, if a user device receives the beacon with the timestamp and must apply the timestamp to identify the content, it could take up to 8 seconds for the user device to wake up and apply time stamp, at which point different content could already be displayed. Thus, the disclosed implementations remove the potential delays and misinterpretations due to time stamps by including the media content identifier within the beacon signal itself.

In some embodiments, the first beacon signal is (720) a BLE beacon or a Wi-Fi beacon signal. In some embodiments, the first beacon signal comprises any RF transmission signal that is sent by wireless transmitter 412.

In some embodiments, a server associated with the kiosk receives (722) an identifier of a user that receives the first beacon. For example, the server 120 receives beacon identifier 606, wherein the beacon identifier includes an identifier of the user associated with user device 112. In some embodiments, the server counts (e.g., tracks and stores) a number of times the user has consumed a respective media item/related media items. For example, the server determines the number of times the user has consumed a respective media item based on signals from client device that indicate the identifier of the user and the identifier of the media content.

The kiosk replaces display (724) of the first media content with display of second media content on the display. For example, after displaying content 612, the kiosk 102 replaces display of the content 612 with display of another content item (e.g., that is also received from a server). In some embodiments, the kiosk replaces display of the first media content with display of second media content based on an instruction from the server. In some embodiments, the kiosk determines when to replace display of content (e.g., and which content to display next).

In some embodiments, the first media content is associated (726) with a first party and the second media content is associated with a second party. For example, the kiosk displays the first media content that is associated (e.g., sponsored by, paid for, and/or provided by) a first provider (e.g., a first media content provider), such as a first company that provides an advertisement as the first media content. The kiosk replaces display of the first media content with display of the second content that is associated with a second party, which can be the same party as the first party or a distinct party (e.g., a different content provider than the first provider).

Upon replacing display of the first media content with the second media content, the kiosk transmits (728), at the radio frequency using the wireless transmitter, a second beacon signal that includes an identifier of the second media content, distinct from the identifier of the first media content. For example, when the kiosk replaces display of the first media content with display of the second content, the kiosk simultaneously (e.g., substantially at the same time) begins transmitting the second beacon and ceases transmitting the first beacon. Thus, the beacon signal that is transmitted by the kiosk reflects (e.g., based on the identifier included in the beacon signal) the respective content that is currently displayed at the kiosk. In some embodiments, the beacon signal includes the identifier of the content that is currently displayed at the kiosk in addition to an identifier of the kiosk. In some embodiments, each media content has a different identifier. For example, the identifier of the respective content is unique to that content item (e.g., even if the content items are associated with a same party).

In some embodiments, a plurality of media content items have a same identifier. For example, if the first media content item and a third media content item are associated with a same party, such that the beacons include an identifier that is associated with the party, where the beacons are transmitted while displaying the first media content and while displaying the third media content.

In some embodiments, each respective beacon signal comprises (730) a predefined number of bits that encodes the respective identifier of respective media content. For example, a first predefined number of bits encode the identifier of the media content that is currently displayed at the kiosk. In some embodiments, each beacon signal includes a promotional offer related to what content is displayed. For example, in addition (or instead of) the beacon signal including bits that encode the identifier of the currently displayed media content, the beacon signal includes content (e.g., a coupon or other image) related to the currently displayed media content.

In some embodiments, the first beacon signal and the second beacon signal include (732) an identifier of the kiosk. In some embodiments, a second predefined number of bits encode information related to the kiosk (e.g., a kiosk identifier), such that the phone can identify the kiosk in which the beacon signal is received. For example, the first beacon signal and the second beacon signal include a kiosk identifier of the kiosk, wherein both beacon signals include the same identifier. In some embodiments, the kiosk identifier includes location information about the kiosk, a name of the kiosk, a party associated with the kiosk, or other identifying information related to the kiosk.

In some embodiments, the kiosk replaces display (734) of the second media content with display of third media content. In some embodiments, the third media content is distinct from the first media content and from the second media content. For example, the kiosk stores at least three content items (e.g., received from the server) and rotates between displaying the three content items on the display. In some embodiments, upon replacing display of the second media content with the third media content, the kiosk transmits, at the radio frequency using the wireless transmitter, a third beacon signal that includes an identifier of the third media content.

In some embodiments, the kiosk replaces display (736) of the third media content with display of the first media content. For example, the kiosk displays the first media content multiple times. In some embodiments, the kiosk does not repeat display of media content (e.g., the media content is dynamically updated to avoid repeating display of the same media content). Upon replacing display of the third media content with the first media content, the kiosk transmits, at the radio frequency using the wireless transmitter, the first beacon signal that includes the identifier of the first media content. For example, each time the kiosk displays the first media content, a same beacon signal (e.g., the first beacon signal) is transmitted. Thus, each media content item is associated with a beacon signal (e.g., that includes an identifier of the respective media content) such that when the kiosk displays the respective media content, the kiosk also transmits the corresponding respective beacon signal.

In some embodiments, a method is performed at a client device (e.g., user device 112) that includes one or more processors and a display. In some embodiments, the client device receives (e.g., wirelessly) a first beacon signal (e.g., at a first radio frequency) that includes an identifier of first media content that is displayed at a display distinct from the client device. For example, the client device receives the beacon signal transmitted by the kiosk, as described with reference to FIG. 6.

In some embodiments, the client device, in response to receiving the first beacon signal, transmits the identifier of the first media content to a server remote from the client device. The client device, after transmitting the identifier of the first media content, receives second media content that is associated with the identifier of the first media content. In some embodiments, the client device displays the second media content at the client device. For example, as described with reference to FIG. 6 above, user device 112 receives content from a server system. In some embodiments, user device 112 receives content from another server system (not shown in FIG. 6). In some embodiments, the first beacon signal that is received by the client device is transmitted by kiosk 102.

In some embodiments, the client device receives a second beacon signal (e.g., from the kiosk 102 or from another kiosk distinct from kiosk 102) that includes an identifier of third media content that is displayed at the display (e.g., display 408) distinct from the client device, wherein the second beacon signal is transmitted upon replacing display of the first media content with the third media content. For example, as explained above, the kiosk 102 transmits a respective beacon signal in accordance with changing the content that is displayed at the kiosk. In some embodiments, the display distinct from the client device comprises a display on an electric vehicle charging station. For example, kiosk 102 is an electric vehicle charging station, and display 408 is a display of the electric vehicle charging station.

In some embodiments, the second media content is provided by a Software Development Kit (SDK) of the client device. For example, the SDK is used to identify the first media content received by the client device, and the second media content is selected and displayed at the client device based on the identification of the first media content. In some embodiments, the beacon signal(s) received by the client device are processed by an SDK of the client device. For example, as explained with reference to FIG. 6, the SDK of user device 112 processes the beacon signal (e.g., and retransmits the beacon signal to server 120). It will be understood that any application executing in the background of the client device may provide additional content and/or process the beacon signals received at the client device.

It will be understood that, although the terms first, second, etc., are, in some instances, used herein to describe various elements, these elements should not be limited by these terms. These terms are only used to distinguish one element from another. For example, a first beacon signal could be termed a second beacon signal, and, similarly, a second beacon signal could be termed a first beacon signal, without departing from the scope of the various described embodiments. The first beacon signal and the second beacon signal are both beacon signals, but they are not the same condition unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method comprising:
   at an electric vehicle charging station (EVCS) that includes an electronic display and a wireless transmitter distinct from the electronic display:
   displaying first media content on the electronic display;
   transmitting, at a radio frequency using the wireless transmitter, a first beacon signal that includes an identifier of the first media content, wherein:
   the first beacon signal is configured to be received at a client device distinct from the EVCS; and
   after receiving the first beacon signal, the client device receives, without user input via a third-party application executing on the client device that is not associated with the EVCS, fourth media content that is related to the first media content associated with the first beacon signal;
   detecting a change in status of the EVCS;
   replacing display of the first media content with display of second media content that is selected based on the status of the EVCS on the electronic display; and
   upon replacing display of the first media content with the second media content, transmitting, at the radio frequency using the wireless transmitter, a second beacon signal that includes an identifier of the second media content, distinct from the identifier of the first media content.

2. The method of claim 1, wherein each respective beacon signal comprises a predefined number of bits that encodes the respective identifier of respective media content.

3. The method of claim 1, wherein the first beacon signal and the second beacon signal include an identifier of the EVCS.

4. The method of claim 1, further comprising, receiving the first media content from a server system, and receiving, from the server system, the identifier of the first media content.

5. The method of claim 1, further comprising sending the identifier of the first media content to a server system.

6. The method of claim 1, wherein the first media content is associated with a first party and the second media content is associated with a second party.

7. The method of claim 1, further comprising:
   replacing display of the second media content with display of third media content, wherein the third media content is distinct from the first media content and from the second media content; and
   upon replacing display of the second media content with the third media content, transmitting, at the radio frequency using the wireless transmitter, a third beacon signal that includes an identifier of the third media content.

8. The method of claim 7, further comprising:
   replacing display of the third media content with display of the first media content; and
   upon replacing display of the third media content with the first media content, transmitting, at the radio frequency using the wireless transmitter, the first beacon signal that includes the identifier of the first media content.

9. The method of claim 1, the EVCS does not receive a confirmation from the client device that the first beacon signal has been received by the client device.

10. The method of claim 1, wherein the fourth media content is received at the client device after a predefined time period has passed since the client device received the first beacon signal.

11. The method of claim 1, wherein the status of the EVCS indicates a type of vehicle that is located at the EVCS, and the second media content is selected based on the type of vehicle.

12. The method of claim 1, wherein the first beacon signal does not include a timestamp.

13. The method of claim 1, wherein the first beacon signal is a BLE beacon or a Wi-Fi beacon signal.

14. The method of claim 1, further comprising, at a server associated with the EVCS, receiving an identifier of a user that receives the first beacon signal.

15. An electric vehicle charging station (EVCS), comprising:
   an electronic display;
   a wireless transmitter distinct from the electronic display;
   one or more processors; and
   memory storing instructions for execution by the one or more processors, the instructions including instructions for:
   displaying first media content on the electronic display;
   transmitting, at a radio frequency using the wireless transmitter, a first beacon signal that includes an identifier of the first media content, wherein:
   the first beacon signal is configured to be received at a client device distinct from the EVCS; and
   after receiving the first beacon signal, the client device receives, without user input via a third-party application executing on the client device that is not associated with the EVCS, fourth media content that is related to the first media content associated with the first beacon signal;

detecting a change in status of the EVCS;

replacing display of the first media content with display of second media content that is selected based on the status of the EVCS on the electronic display; and upon replacing display of the first media content with the second media content, transmitting, at the radio frequency using the wireless transmitter, a second beacon signal that includes an identifier of the second media content, distinct from the identifier of the first media content.

16. A non-transitory computer-readable storage medium storing one or more programs comprising instructions, executable by an electric vehicle charging station (EVCS) including an electronic display, a wireless transmitter, and one or more processors, for:

displaying first media content on the electronic display;

transmitting, at a radio frequency using the wireless transmitter, a first beacon signal that includes an identifier of the first media content, wherein:

the first beacon signal is configured to be received at a client device distinct from the EVCS; and after receiving the first beacon signal, the client device receives, without user input via a third-party application executing on the client device that is not associated with the EVCS, fourth media content that is related to the first media content associated with the first beacon signal;

detecting a change in status of the EVCS;

replacing display of the first media content with display of second media content that is selected based on the status of the EVCS on the electronic display; and upon replacing display of the first media content with the second media content, transmitting, at the radio frequency using the wireless transmitter, a second beacon signal that includes an identifier of the second media content, distinct from the identifier of the first media content.

\* \* \* \* \*